United States Patent
Peddireddy et al.

(10) Patent No.: US 8,244,237 B2
(45) Date of Patent: Aug. 14, 2012

(54) HANDSET SELF DIAGNOSTICS

(75) Inventors: Sudheer Kumar Peddireddy, Garland, TX (US); Vani Budhati, Garland, TX (US); Sundararajan Chellappan, Garland, TX (US); Rohit Kothari, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1247 days.

(21) Appl. No.: 11/535,293

(22) Filed: Sep. 26, 2006

(65) Prior Publication Data
US 2008/0084993 A1 Apr. 10, 2008

(51) Int. Cl.
*H04W 24/00* (2009.01)

(52) U.S. Cl. ......... 455/425; 455/423; 455/420; 455/418

(58) Field of Classification Search .......... 455/418–420, 455/423–425, 550.1–560
See application file for complete search history.

(56) References Cited

U.S. PATENT DOCUMENTS

| | | | | |
|---|---|---|---|---|
| 6,567,674 | B1 * | 5/2003 | Fujiwara | 455/557 |
| 6,836,670 | B2 * | 12/2004 | Castrogiovanni et al. | 455/558 |
| 7,024,187 | B2 * | 4/2006 | Moles et al. | 455/423 |
| 7,047,004 | B1 * | 5/2006 | Tolbert, II | 455/425 |
| 7,206,548 | B1 * | 4/2007 | Sumler et al. | 455/67.11 |
| 7,228,129 | B1 * | 6/2007 | Ward et al. | 455/423 |
| 7,283,816 | B2 * | 10/2007 | Fok et al. | 455/423 |
| 7,321,766 | B2 * | 1/2008 | Liu et al. | 455/425 |
| 7,369,846 | B2 * | 5/2008 | Koivukangas et al. | 455/425 |
| 7,483,694 | B2 * | 1/2009 | Varanda | 455/423 |
| 7,539,503 | B2 * | 5/2009 | Suzuki et al. | 455/507 |
| 7,555,306 | B2 * | 6/2009 | Liu | 455/522 |
| 7,561,877 | B2 * | 7/2009 | Cassett et al. | 455/423 |
| 7,596,373 | B2 * | 9/2009 | McGregor et al. | 455/425 |
| 7,646,725 | B1 * | 1/2010 | Soukup et al. | 370/252 |
| 7,778,260 | B2 * | 8/2010 | Sturniolo et al. | 370/401 |
| 2003/0148758 | A1 * | 8/2003 | McMullin | 455/415 |
| 2004/0235459 | A1 * | 11/2004 | Juntunen | 455/414.1 |
| 2006/0046647 | A1 * | 3/2006 | Parikh et al. | 455/11.1 |
| 2006/0281452 | A1 * | 12/2006 | Anderton | 455/423 |
| 2007/0117560 | A1 * | 5/2007 | Pora et al. | 455/423 |
| 2007/0197206 | A1 * | 8/2007 | Olson et al. | 455/423 |
| 2008/0084992 | A1 * | 4/2008 | Peddireddy et al. | 379/433.01 |
| 2009/0143059 | A1 * | 6/2009 | Britt et al. | 455/419 |

OTHER PUBLICATIONS

Patent application entitled "Remote Handset Diagnostics," filed Sep. 26, 2006, as U.S. Appl. No. 11/535,283.

\* cited by examiner

*Primary Examiner* — Ajit Patel
*Assistant Examiner* — Ronald Eisner

(57) ABSTRACT

A system for handset self diagnostics is provided. The system includes a handset and a diagnostic engine on the handset to obtain diagnostic data for the handset. The system also includes an application on the handset, and the application includes at least one user interface that uses the diagnostic data to assist a user of the handset to operate the handset.

20 Claims, 6 Drawing Sheets

HANDSET SELF DIAGNOSTICS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A handset may refer to a mobile phone, a wireless handset or telephone, a pager, a personal digital assistant, a portable computer, a tablet computer, or a laptop computer. When a user of the handset needs assistance in operating a handset, the user may contact a customer service center for a telecommunications network carrier. The customer service center may only provide certain assistance to the user, which may be limited when the handset is not physically present at the customer service center. If the customer service center cannot assist the user in operating the handset, the customer service center may send the handset to the handset manufacturer, and may charge the handset manufacturer for the return. Also, customer satisfaction may decrease when the handset is at the customer service center or at the handset manufacturer. Servicing the handset at the customer service center or at the handset manufacturer may create expenses for the network carrier, the handset manufacturer, or both.

SUMMARY

In one embodiment, a system for handset self diagnostics is provided. The system includes a handset and a diagnostic engine on the handset to obtain diagnostic data for the handset. The system also includes an application on the handset, and the application includes at least one user interface that uses the diagnostic data to assist a user of the handset to operate the handset.

In another embodiment, a system for handset self diagnostics is provided. The system includes a handset operable for use by a user for wireless communication. The system also includes a diagnostic engine to obtain diagnostic data for the handset. Additionally, the system includes an application on a computer of the user, with the computer in communication with the handset. The application includes at least one user interface that uses the diagnostic data to assist the user of the handset to operate the handset.

In yet another embodiment, a method for handset self diagnostics is provided. When a handset is inoperable to communicate via a carrier wireless network, a computer of a user of the handset communicates with the handset. An application is selected using the computer to obtain diagnostic data from the handset to enable the handset to communicate via the carrier wireless network. When the application cannot enable the handset to communicate via the carrier wireless network, the computer of the user is used as a proxy to promote communication between the handset and a customer service system of the carrier to attempt to resolve the issue.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

To reduce expenses and customer dissatisfaction when a handset is at a customer service center or at a handset manufacturer, embodiments of the present disclosure enable a handset user to perform self-diagnosis on a handset. The user may use the handset to access diagnostic data to correct a handset problem. Unlike typical settings information, the present system enables the user to access diagnostic data on the handset. An example of such diagnostic data may be codes or information related to dropped calls. Such information is maintained on the handset, but not readily available to the handset user without an application provided by some embodiments of the present disclosure.

In some embodiments, the handset user may use a personal computer communicating with the handset to correct handset problems. For example, if the user cannot correct problems by using the handset, the user may use the personal computer to correct the problem. In other embodiments of the present disclosure, when the handset has a problem making calls or cannot otherwise communicate with the wireless telecommunications network, the user may use the personal computer as a proxy to promote communication between the handset and a customer service system of the carrier. This communication with the customer service system, either directly or via the user's personal computer, may assist in correcting the handset communication or other problems.

Figure 1:
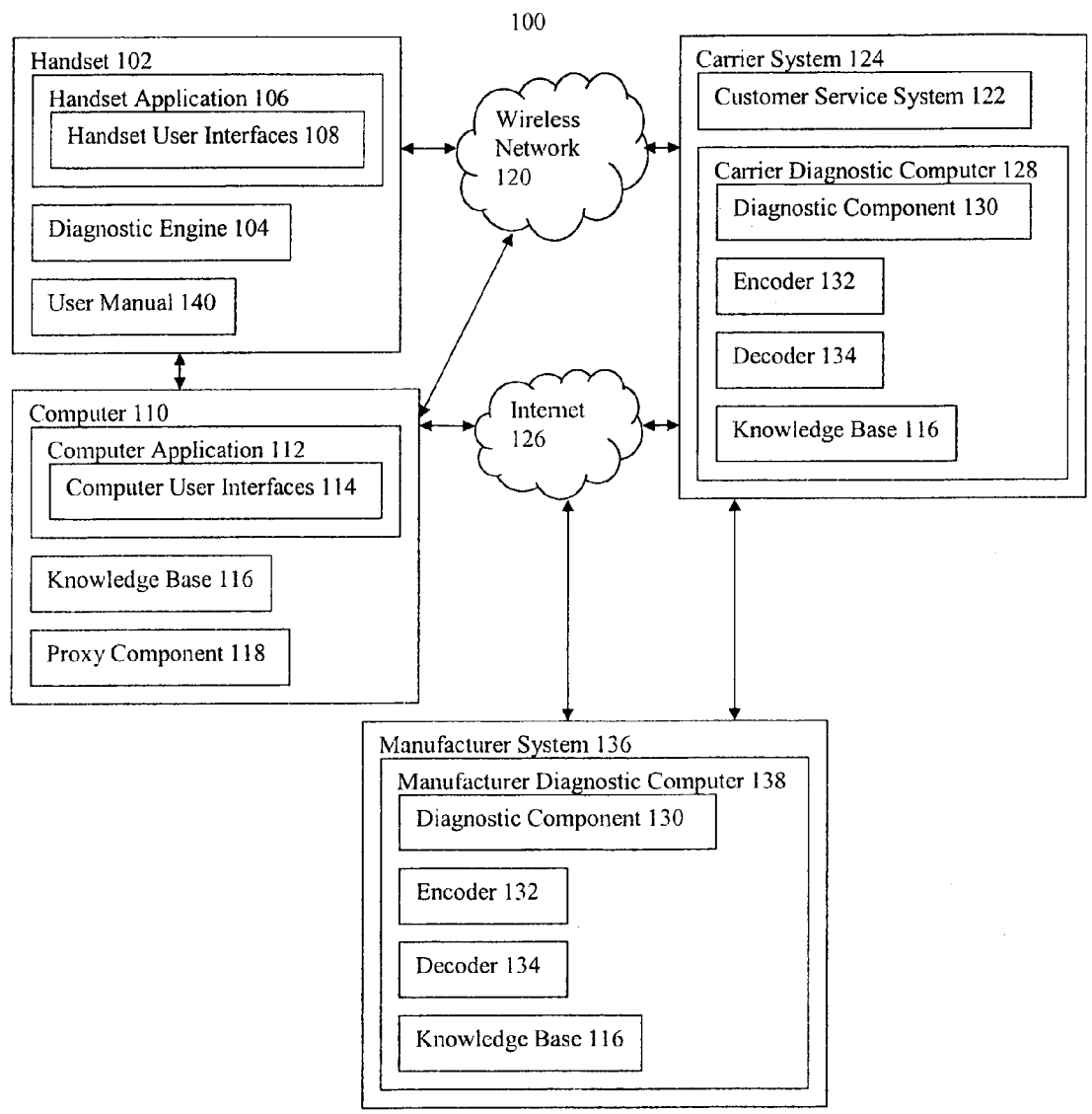
FIG. 1 shows a handset self diagnostics system according to an embodiment of the present disclosure.

FIG. 1 depicts a handset self diagnostics system 100 according to an embodiment of the present disclosure. The system 100 includes a handset 102, which includes the diagnostic engine 104. The handset 102 is described in more detail below with reference to FIGS. 4-6. The system 100 shows only one handset for the purpose of illustration, but the system 100 may include any number of handsets.

The handset 102 also includes a handset application 106, which includes a handset user interface 108. The handset application 106 is software that includes the handset user interface 108 which may be a GUI (graphical user interface) that enables a user of the handset 102 to access diagnostic data from the diagnostic engine 104 on the handset 102 to assist the user to operate the handset 102. Diagnostic data is information related to the operation of the handset 102, and may include, but is not limited to, dropped calls information, error logs, records of problems, CPU or processor activity or usage, system level, or information other than handset settings. Handset settings and settings related information are typically more readily accessible to users than diagnostic data.

The handset 102 may also include a user manual 140. The user manual 140 may be located on the handset 102, on the computer 110, and/or on a diagnostic computer. A comprehensive user manual 140 for the handset 102 is not usually available on handsets such mobiles phones or personal digital assistants. Similar to help options on personal computer applications, embodiments of the present disclosure provide the user manual 140 on the handset 102, the computer 110, or a diagnostic computer so that a handset user has it readily available as a reference, in lieu of a paper version of the user manual 140 which is typically not kept with the handset 102. The handset 102 could internally use SMS (Short Message Service) for various functions including retrieving and presenting the user manual 140 and/or other applications.

The handset 102 may communicate with a computer 110, which may be the handset user's computer, but is not a computer operated by the wireless telecommunication provider or handset manufacturer. The handset 102 may communicate with the computer 110 wirelessly or by a wired connection. The computer 110 includes a computer application 112, which includes a user interface 114. The computer application 112 includes the computer user interface 114 to enable the user of the handset 102 to access diagnostic data from the diagnostic engine 104 on the handset 102 to assist the user to operate the handset 102. The computer application 112 may include components similar to the components in the handset application 106. However, the computer application 112 may provide additional assistance and functionality beyond that of the handset application 106. For example, the computer application 112 may provide or instruct the diagnostic engine 104 to execute additional diagnostic tests on the handset 102. For example, the handset may not have been provided with the most recent or updated diagnostic information or testing capabilities. The computer application 112 may have or be able to easily obtain, such as by downloading via the Internet, specific or additional capabilities to access different systems in the handset 102.

The computer 110 also includes a knowledge base 116. The knowledge base 116 is a database that may include records regarding specific handset problems and specific actions that the computer 110 uses to assist the user with each specific handset problem. Each time a handset problem is solved, the computer 110 may update the knowledge base 116. Although not shown in FIG. 1, the handset 102 may also include the knowledge base 116. However, the knowledge base 116 on the handset 102 may be limited relative to the knowledge base 116 on the computer 110 because of storage limitations on the handset 102. The knowledge base 116 on the computer 110 may include or be able to download additional or updated records regarding specific handset problems to which the handset application 106 may not have access.

Additionally, the computer 110 includes a proxy component 118. When the handset 102 is inoperable or unable to communicate with a wireless network 120, the user of the handset 102 may use the computer 110 to communicate with the handset 102. The user may use the proxy component 118 on the computer 110 to promote communication between the handset 102 and a customer service system 122 for a telecommunications carrier system, or carrier system 124. The proxy component 118 allows the carrier system 124 access to the handset 102 via the wireless network 120, or an alternative communication system, such as the Internet 126.

The handset 102 may also communicate directly with the carrier system 124 through the wireless network 120. The carrier system 124 includes the customer service system 122 and a carrier diagnostic computer 128. A diagnostic computer is a computer for communicating with the diagnostic engine 104 and assisting the user to operate the handset 102. The diagnostic computer 128 may assist the user to operate the handset 102 by sending software or firmware to the handset 102. The carrier diagnostic computer 128 is a diagnostic computer used by the carrier system 124. The user of the handset 102 may communicate with the customer service system 122 to obtain assistance with the handset 102. The customer service system 122 may use the carrier diagnostic computer 128 to diagnose the handset 102 to assist the user with the handset 102.

The carrier diagnostic computer 128 may include components, such as the knowledge base 116, similar to the components in the computer 110. However, the carrier diagnostic computer 128 may have additional or updated diagnostic information or capabilities that the computer 110 and the handset application 106 may not have. Also, the carrier diagnostic computer 128 may have specific capabilities to access different or additional systems in the handset 102.

The carrier diagnostic computer 128 includes a diagnostic component 130, an encoder 132 and a decoder 134. The diagnostic component 130 may be, for example, a software application used to promote communicate with the diagnostic engine 104. It should be appreciated that each different handset may include a different diagnostic engine and consequently each handset may require a different application or interface to communicate with the diagnostic engine of that handset. Also each diagnostic engine may generate or record diagnostic data that is proprietary and specific to a particular handset. The manufacturers may develop specific tools to communicate with the proprietary diagnostic engine on each of the different handsets they manufacture. These systems are typically not provided to the telecommunications carriers.

According to the present disclosure, the encoder 132 and decoder 134 may be systems provided by the manufacturer that are capable of communicating with the diagnostic engine 104 on the handset 102, either directly or indirectly. In some embodiments, the diagnostic component 130 may be a tool or interface to promote communication with the diagnostic engine 104 by employing the capabilities of the encoder and decoder 132 and 134. That is, multiple encoders and decoders 132 and 134, each capable of communicating with different diagnostic engines 104 on different handsets 102, might be provided on the carrier's diagnostic computer 128. Although only one encoder and decoder 132, 134 are shown, multiple encoders and decoders 132, 134 might be present. The diagnostic component 130 might also provide a common GUI (graphical user interface) for customer service representatives to work the multiple handsets 102 and diagnostic engines 104.

The diagnostic component 130, along with other systems, might provide the communication capabilities to promote remote communication with the handset 102 and diagnostic engine 104. For example, the diagnostic component 130 might send scripts or other inputs to the diagnostic engine 104 that were obtained from the encoder 132. Communications received by the diagnostic component 130 from the diagnostic engine 104 might be referred to the decoder 134 for interpretation. The encoder 132 may change signals, communications, or requests from the diagnostic component 130 into code, or signals understandable to the diagnostic engine 104. Similarly, the decoder 134 may change code, data, or instructions received from the diagnostic engine 104 back into data understandable to a diagnostic computer 128 or diagnostic component 130.

The diagnostic component 130, encoders 132, and/or decoders 134 might be provided with a standard interface or API (application programming interface) so different manufacturers' encoders and decoders 132, 134 may communicate with the diagnostic component 130. Other ways of handling the communication between the diagnostic component 130, encoders 132, and/or decoders 134 to promote communication with the diagnostic engine 104 will readily suggest themselves to one skilled in the art in light of the present disclosure. Additional information on the diagnostic component 130, encoders 132, and/or decoders 134 is provided in co-pending U.S. patent application Ser. No. 11/535,283, filed Sep. 26, 2006, entitled "Remote Handset Diagnostics," by Sudheer Kumar Peddireddy, et al., referenced above, which is incorporated herein by reference.

The carrier diagnostic computer 128 may use the knowledge base 116 accessed by the carrier diagnostic computer 128 to assist the user to operate the handset 102. Each time a handset problem is solved, the carrier diagnostic computer 128 may update the knowledge base 116 accessed by the carrier diagnostic computer 128.

The handset 102 user may also obtain assistance directly from the manufacturer via the wireless network 120, or, when the handset 120 is inoperable, may communicate indirectly with the manufacturer system 136 using the computer 110 via the Internet 126. The manufacturer system 136 may include a manufacturer diagnostic computer 138, which may be similar to the carrier diagnostic computer 128. The manufacturer diagnostic computer 138 is a diagnostic computer used by the handset manufacturer. The manufacturer diagnostic computer 138 may include components substantially similar to the components in the carrier diagnostic computer 128, such as the diagnostic component 130, the encoder 132, the decoder 134, and the knowledge base 116.

The handset manufacturer may have additional or updated diagnostic information or capabilities that the carrier diagnostic computer 128, the computer 110, or the handset application 106 may not have. Further, the manufacturer diagnostic computer 138 may have specific capabilities to access different systems or functionality in the handset 102. The knowledge base 116 on the manufacturer diagnostic computer 138 may include additional or updated records regarding specific handset problems that the carrier diagnostic computer 128, the computer 110, or the handset application 106 may not have.

Figure 2:
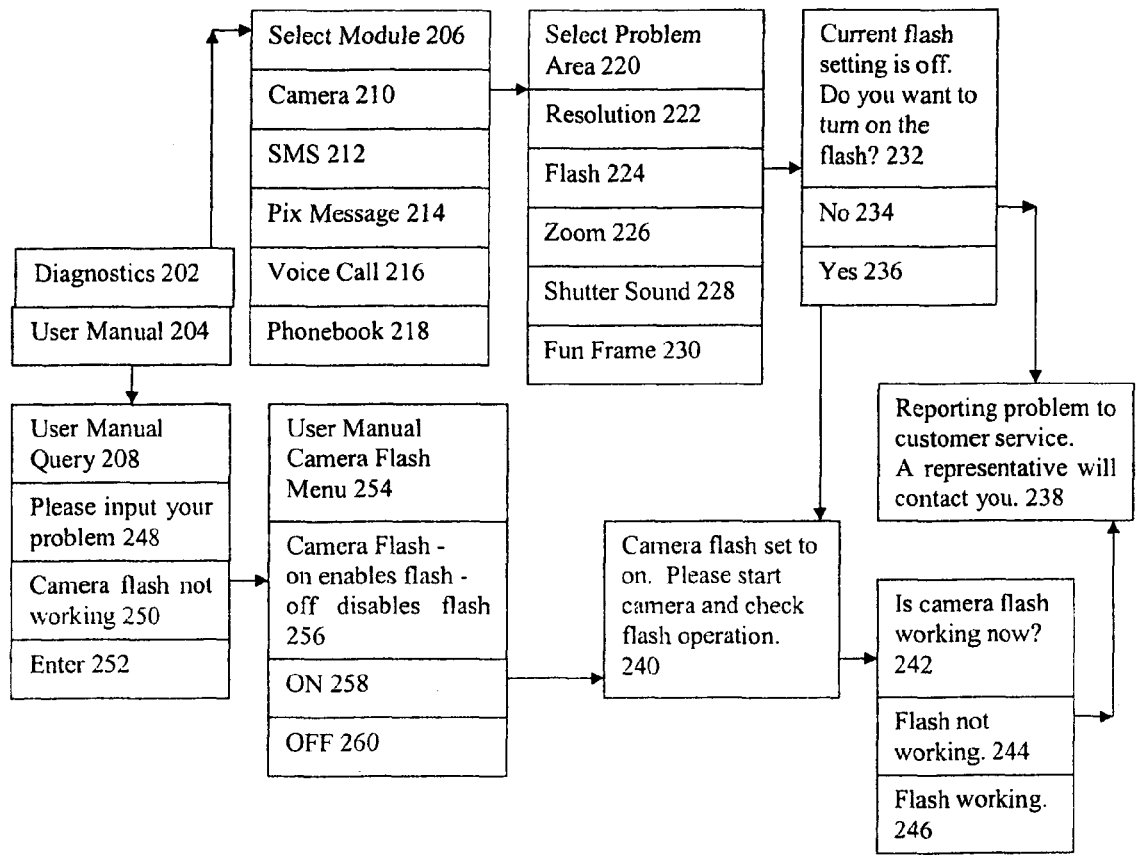
FIG. 2 shows a block diagram of a handset user interface according to an embodiment of the present disclosure.

Turning now to FIG. 2, a block diagram of a handset user interface is depicted according to an embodiment of the present disclosure. These illustrative handset user interfaces may be examples of the handset user interfaces 108 that may be displayed on the handset 102 by the handset application 106. The user interfaces depicted in FIG. 2 are examples of the handset user interfaces 108 that may be displayed in response to a sequence of user selections made by a user experiencing a problem with a camera, for example, a flash problem for a camera. Although flash related problems may be diagnostics information or user settings depending on the handsets, flash problems are provided as an example of a diagnostic problem that may require the use of diagnostic data to correct. However, as used herein, diagnostic data is any information that is normally not available to a user through standard settings, and may include, but is not limited to, information about an operating system, hardware, software, firmware, system serial numbers, dropped calls, other proprietary information, or any other non-setting data.

The first options that may be displayed to the user of the handset 102 by the handset application 106 may be a diagnostics 202 option and a user manual 204 option. By selecting the diagnostics 202 option, the handset application 106 may display the diagnostic portion of the handset application 106, which provides further options related to handset diagnostics, such as the options displayed under a "select module" 206 heading.

The options displayed under the "select module" 206 heading may include a camera 210 option, a SMS 212 option, a pix message 214 option, a voice call 216 option, and a phonebook 218 option. By selecting the camera 210 option, the user may select further options related to a camera and a camera controller. By selecting the SMS 212 option, the user may select further options related to a short message service for providing alphanumeric messaging. By selecting the pix message 214 option, the user may select further options related to digital picture messages. By selecting the voice call 216 option, the user may select further options related to audio messages and call settings. By selecting the phonebook 218, the user may select further options related to a database of telephone numbers, associated names and so on.

For example, if the user selects the camera 210 option, the handset application 106 may display a "select problem area" 220 heading. The options displayed under the "select problem area" 220 heading may include a resolution 222 option, a flash 224 option, a zoom 226 option, a shutter sound 228 option, and a fun frame 230 option. By selecting the resolution 222 option, the user may select further options related to the level of detail for digital pictures taken by the camera. By selecting the flash 224 option, the user may select further options related to the light produced by the flash to help illuminate a scene for photographing. By selecting the zoom 226 option, the user may select further options related to adjusting the lens magnification. The shutter sound 228 option may provide options related to the sound made by the device when taking a picture. The fun frame 230 may provide options related to a selection of digital frames that may be displayed around the digital pictures taken by the camera.

If the user selects the flash 224 option, the handset application 106 may display, for example, the heading "Current flash setting is off. Do you want to turn on the flash?" 232. The handset application 106 may respond to the selection of the flash 224 option by executing the first diagnostic engine 104, which may obtain diagnostic data for the handset 102, such as handset 102 diagnostic data. The diagnostic data obtained by the diagnostic engine 104 may indicate that the flash option for the camera is inoperative because the flash setting is set to off. In response to this indication, the handset application 106 may display the message "Current flash setting is off. Do you want to turn on the flash?" 232. In response to the message 232, the user may select the no 234 or the yes 236 options.

The user may select no 234 if the user wants the flash to stay off or if the user has already tried unsuccessfully to turn the flash on. The handset application 106 might respond to the user selection of the no 234 option by displaying a message "Reporting problem to customer service. A representative will contact you." 238. At this point, the handset 102 may report the flash problem for the camera to the customer service system 122. A customer service representative may respond by contacting the user immediately, or at a later time.

Alternatively, the user may select the yes 236 option in response to the message "Current flash setting is off. Do you want to turn on the flash?" 232. For this example, the handset application 106 responds to this selection by displaying a message "Camera flash set to on. Please start camera and check flash operation." 240. After displaying the message 240, the handset application 106 displays a message "Is camera flash working now?" 242 and both a Flash not working 244 option and a Flash working 246 option, might then be displayed. If the user responds to the message 242 by selecting the Flash working 246 option, the process depicted in FIG. 2 terminates. If the user responds to the message 242 by selecting the flash not working 244 option, the handset application 106 responds to this user selection by displaying the message "Reporting problem to customer service. A representative will contact you." 238. After reporting the problem to customer service, the process depicted in FIG. 2 terminates.

By selecting the user manual 204 option, the handset application 106 may display the help portion of the handset application 106, which includes further options related to user manual data, such as the options displayed under a "user manual query" 208 heading. User manual data is a set of information provided by the handset manufacturer that instructs the user how to operate the handset 102.

In another example, if the user selects the user manual 204 option, the handset application 106 may display the options headed by the message "user manual query" 208. The options headed by the message "user manual query" 208 may include a message "please input your problems" 248. In response to the message 248, the user may enter a response "camera flash not working" 250, and select an enter 252 option. In response to the user selecting the enter 252 option, the handset application 106 obtains user manual data from the user manual 140. The user manual 140 may be located on the handset 102, on the computer 110, or on a diagnostic computer. The user manual 140 may be accessed directly, or may be accessed indirectly through the computer 110 or through the computer 110 and the proxy component 118.

In response to the user selecting the enter 252 option after entering the response 250, the handset application 106 may query the data from the user manual 140 and display a message "user manual camera flash menu" 254. The user interface headed by the message "user manual camera flash menu" 254 may include a message "camera flash—on enables flash—off disables flash" 256, and both an on 258 option and an off 260 option. In response to the message 256, the user may select the on 258 option to set the flash on for the camera. In response to the user selecting the on 258 option, the handset application 106 may display the message "Camera flash set to on. Please start camera and check flash operation." 240. After displaying the message 240, the handset application 106 displays the message "Is camera flash working now"? 242 and both a flash not working 244 option and a flash working 246 option. If the user responds to the message 242 by selecting the flash working 246 option, the process depicted in FIG. 2 terminates. If the user responds to the message 242 by selecting the flash not working 244 option, the handset application 106 responds to this user selection by displaying the message "Reporting problem to customer service. A representative will contact you." 238. At this point, the handset 102 reports the flash problem for the camera to the customer service system 122, and the process depicted in FIG. 2 terminates. Although not shown, the interfaces illustrated in FIG. 2 may also include the settings interfaces and capabilities typically found on handsets 102.

Figure 3:
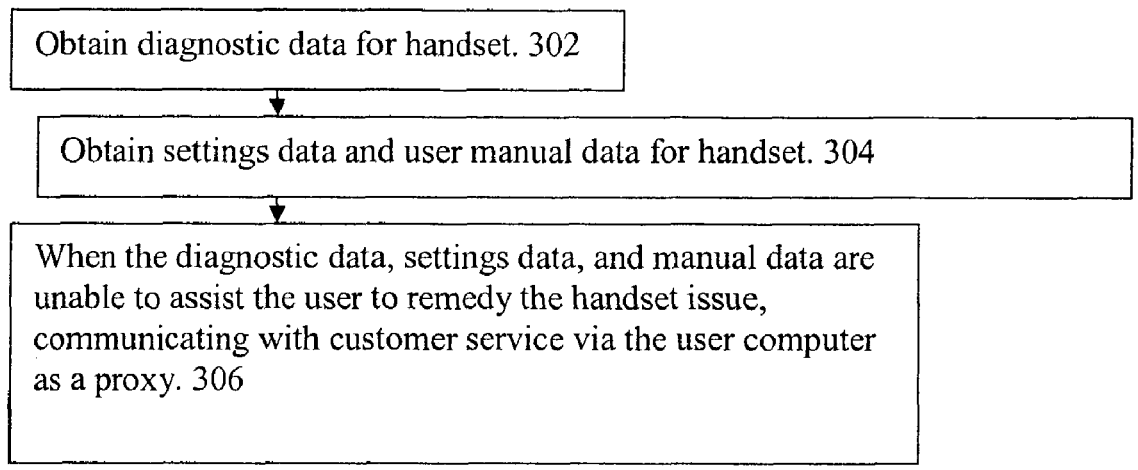
FIG. 3 shows a flow chart of a method for handset self diagnostics according to an embodiment of the present disclosure.

Turning now to FIG. 3, a flowchart of a method for handset self diagnostics is depicted according to an embodiment of the present disclosure. The method for handset self diagnostics may begin when the user accesses the handset application 106 with a request for assistance to operate the handset 102. The user may request assistance to operate the handset 102 because the user may lack knowledge to operate all the various features of the handset 102. Such a request for assistance may often be met by offering the user access to the user manual 140. The user may also request assistance to operate the handset 102 due to a handset problem, which may be caused by handset software, handset hardware, or a combination of the handset software and the handset hardware. The boxes in the flowchart depicted in FIG. 3 may be executed either in varying orders depending on the selections made by the user of the handset 102.

At block 302, the user may obtain diagnostics data by accessing the handset application 106 and user interfaces 108. The diagnostic engine 104 on the handset 102 is able to obtain diagnostic data from the handset which may be used to resolve the handset related problems. At block 304, the user may obtain settings data and/or user manual data to assist the user in resolving the problem with the handset. Finally, at block 306, when the diagnostics data, settings data and manual data are unable to assist the user in resolving the handset issue, the user may communicate with customer service regarding the problem. When the handset is unable to communicate, or make a call, the user may connect the handset to the user's computer 110 wirelessly or via wired connection and thereafter employ the user's computer 110 as a proxy to remotely communicate with the carrier system 124 and customer service to obtain assistance in resolving the problem.

It should be appreciated that the diagnostic and other data and information collected may be stored on a storage device on the handset 102 and periodically retrieved and communicated to other systems. Alternatively, the diagnostic and other data and information might be collected from the handset 102 and then transmitted without being stored, or some data or portions of the data might be stored, temporarily or otherwise, and then transmitted to the relevant systems.

Figure 4:
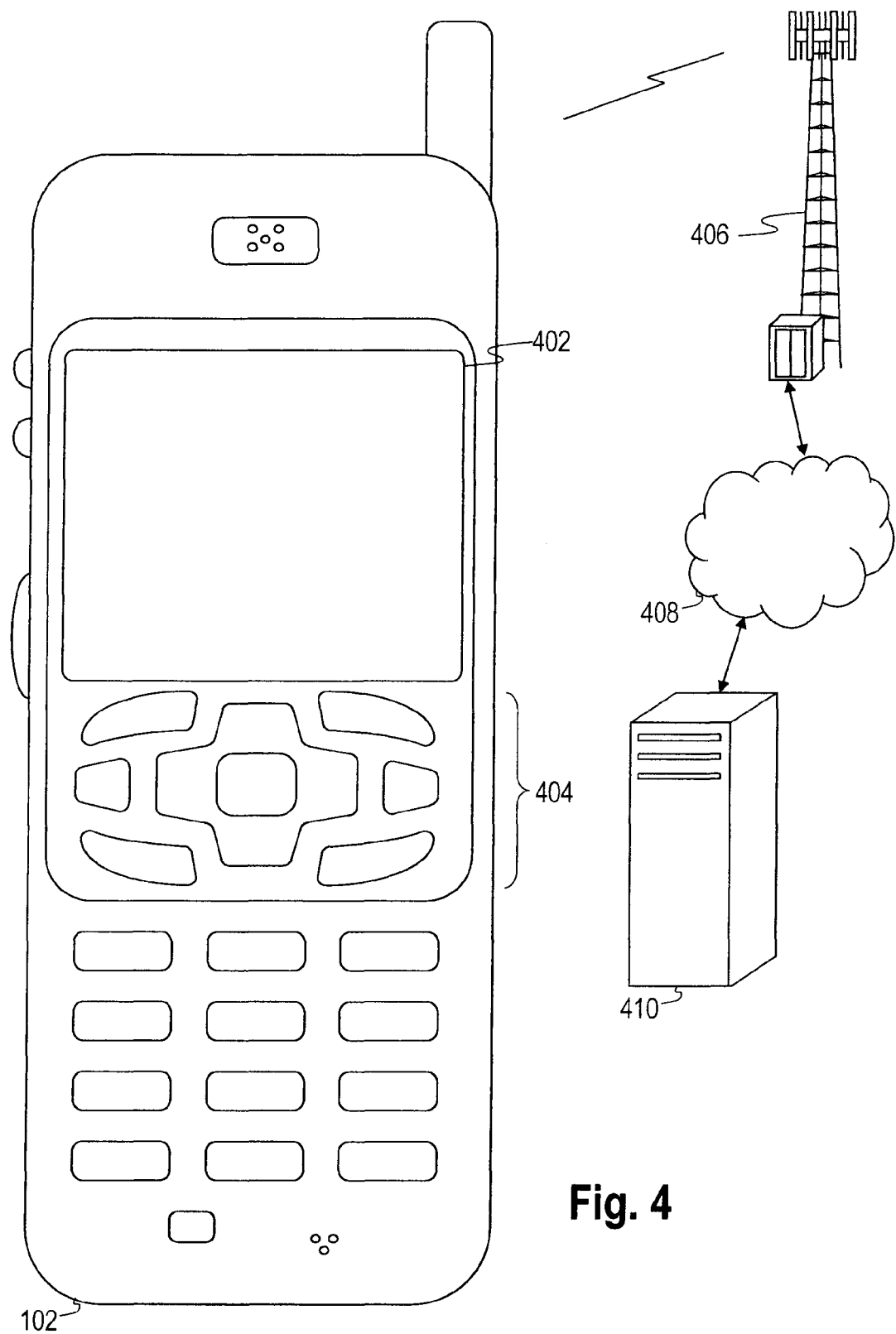
FIG. 4 shows an illustrative wireless communications system.

FIG. 4 shows a wireless communications system including the handset 102. FIG. 4 depicts the handset 102, which is operable for implementing aspects of the present disclosure, but the present disclosure should not be limited to these implementations. Though illustrated as a mobile phone, the handset 102 may take various forms including a wireless handset, a pager, a personal digital assistant (PDA), a portable computer, a tablet computer, or a laptop computer. Many suitable handsets combine some or all of these functions. In some embodiments of the present disclosure, the handset 102 is not a general purpose computing device like a portable, laptop or tablet computer, but rather is a special-purpose communications device such as a mobile phone, wireless handset, pager, or PDA.

The handset 102 includes a display 402 and a touch-sensitive surface or keys 404 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset. The handset 102 may further execute one or more software or firmware applications in response to user commands. These applications may configure the handset 102 to perform various customized functions in response to user interaction.

Among the various applications executable by the handset 102 are a web browser, which enables the display 402 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the handset 102 has access to information on various servers, such as a server 410. The server 410 may provide content that may be shown on the display 402.

Figure 5:
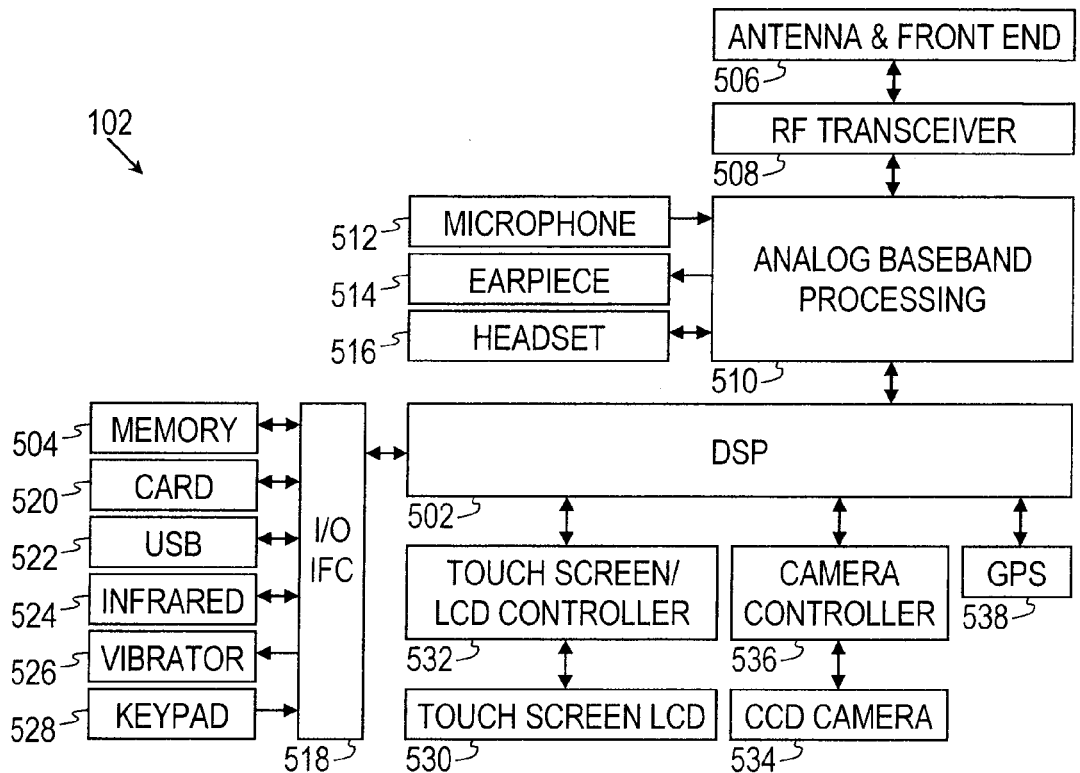
FIG. 5 shows a block diagram of an illustrative handset.

FIG. 5 shows a block diagram of the handset 102. The handset 102 includes a digital signal processor (DSP) 502 and a memory 504. As shown, the handset 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the handset 102 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 102 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the handset 102 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 102 to function as a peripheral device to exchange information with a personal computer or other computer system. The infrared port 524 and other optional ports such as a Bluetooth interface or an IEEE 802.11 compliant wireless interface may enable the handset 102 to communicate wirelessly with other nearby handsets and/or wireless base stations.

The input/output interface 518 may further connect the DSP 502 to the vibrator 526 that, when triggered, causes the handset 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 102. Another input mechanism may be the touch screen LCD 530, which may also display text and/or graphics to the user. The touch screen LCD controller 532 couples the DSP 502 to the touch screen LCD 530.

The CCD camera 534 enables the handset 102 to take digital pictures. The DSP 502 communicates with the CCD camera 534 via the camera controller 536. The GPS sensor 538 is coupled to the DSP 502 to decode global positioning system signals, thereby enabling the handset 102 to determine its position. Various other peripherals may also be included to provide additional functions, e.g., radio and television reception.

Figure 6:
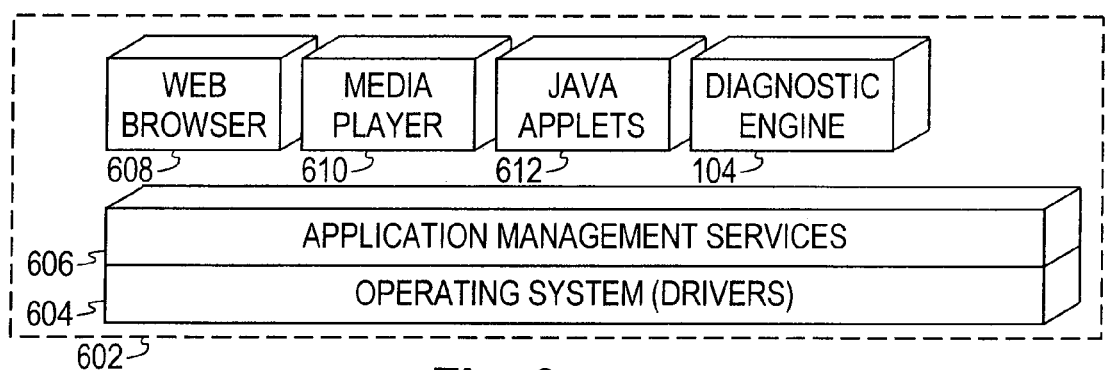
FIG. 6 shows a diagram of an illustrative software configuration for a handset.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 102. Also shown in FIG. 6 are a web browser application 608, a media player application 610, Java applets 612, and the diagnostic engine 104. The web browser application 608 configures the handset 102 to operate as a web browser, allowing a user to enter information into forms and select links to retrieve and view web pages. The media player application 610 configures the handset 102 to retrieve and play audio or audiovisual media. The Java applets 612 configure the handset 102 to provide games, utilities, and other functionality. The diagnostic engine 104 is a component that may generate or record information related to the operation of the handset 102 as discussed above.

Figure 7:
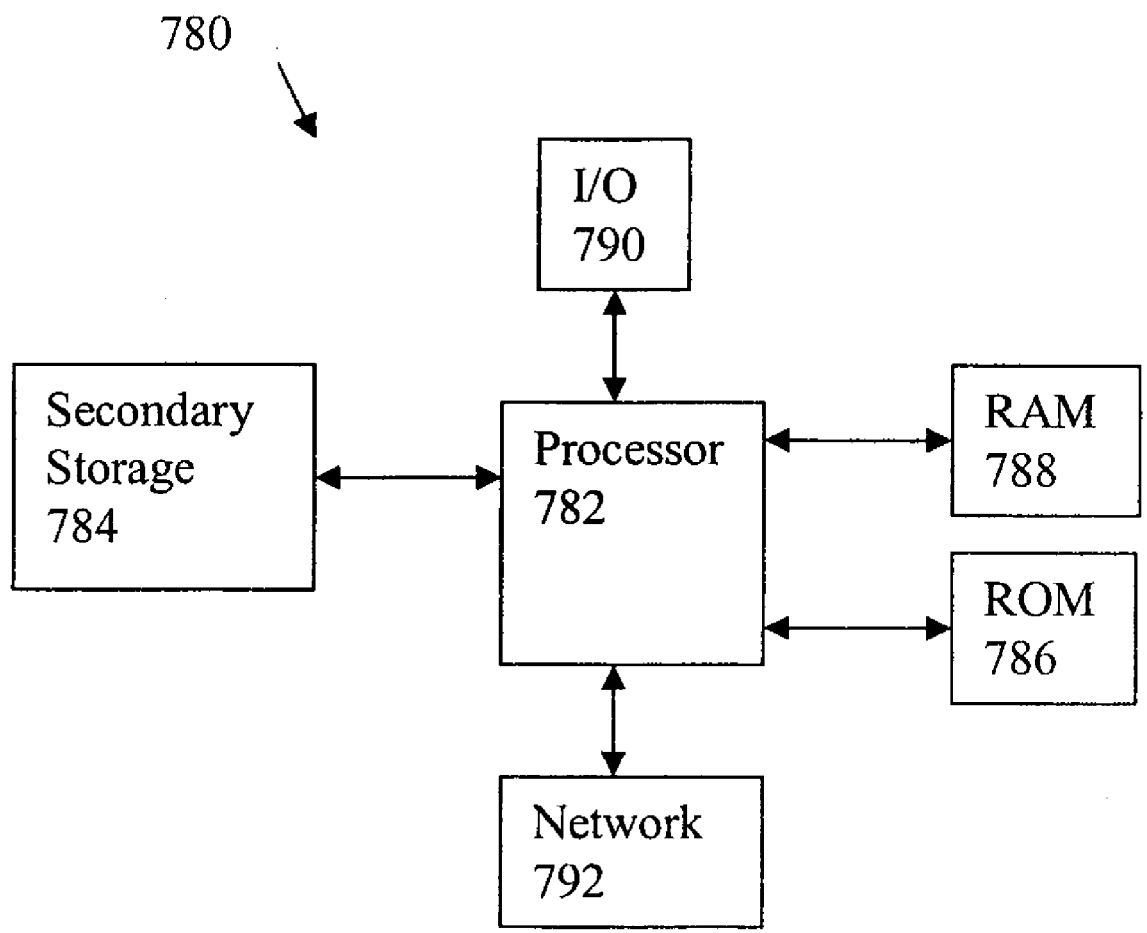
FIG. 7 shows an exemplary general purpose computer system suitable for implementing the several embodiments of the disclosure.

One or more applications or systems described above may be implemented on any general-purpose computer with sufficient processing power, memory resources, and network throughput capability to handle the necessary workload placed upon it. FIG. 7 illustrates a typical, general-purpose computer system which may be used as the computer 110, carrier and/or manufacturer diagnostic computers 128, 138 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) 790 devices, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O 790 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 792 devices may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity 792 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for handset diagnostics, comprising:
   a handset;
   a diagnostic engine on the handset configured to obtain diagnostic data for the handset from a customer service system; and
   a first application on the handset comprising at least one user interface that is configured to use the diagnostic data to assist a user of the handset to operate the handset;
   a second application on a computer configured to:
   when said second application is unable to enable the handset to communicate via the carrier wireless network, using another computer of the user as a proxy to promote communication between the handset and a customer service system of the carrier wireless network to enable the handset to communicate via the carrier wireless network, the customer service system comprising a tool configured to obtain the diagnostic data.

2. The system of claim 1, wherein the handset is selected from a group consisting of a mobile phone, a wireless handset, a personal digital assistant, a portable computer, a tablet computer, and a laptop computer.

3. The system of claim 1, wherein the diagnostic data includes error logs and dropped calls information which are accessible to the user of the handset only by the application.

4. The system of claim 1, wherein the application is configured to use settings data to assist the user to operate the handset.

5. The system of claim 1, wherein the application is configured to use user manual data to assist the user to operate the handset.

6. The system of claim 1, wherein the user interface is configured to provide an option for the user to contact a carrier customer service system for the handset when the user requires assistance to operate the handset.

7. A system for handset diagnostics, comprising:
   a handset;
   a diagnostic engine on the handset configured to obtain diagnostic data for the handset from a customer service system;
   a first application on the handset comprising at least one user interface that is configured to use the diagnostic data to assist a user of the handset to operate the handset; and
   a second application on a computer configured to:
   when said second application is unable to enable the handset to communicate via the carrier wireless network, using another computer of the user as a proxy to promote communication between the handset and a customer service system of the carrier wireless network to enable the handset to communicate via the carrier wireless network, the customer service system comprising a tool configured to obtain the diagnostic data.

8. The system of claim 7, wherein the diagnostic data used to assist the user to operate the handset is further configured to be used to assist the user with handset problems.

9. The system of claim 7, wherein the computer and the handset are configured to communicate via a communication channel selected from a group consisting of a wired connection, a wireless connection, an infra-red connection, and an optical connection.

10. The system of claim 7, further comprising:
a carrier customer service system; and
a proxy component configured on the computer of the user to promote communication between the handset and the carrier customer service system to enable the carrier customer service system to assist the user to operate the handset.

11. The system of claim 10, wherein the carrier customer service system includes a diagnostics component configured to communicate with the diagnostic engine on the handset via the computer of the user and the proxy component.

12. The system of claim 10, wherein the diagnostic data includes error logs and dropped calls information which are accessible to the user of the handset only by the application, wherein the application is configured to use user manual data to assist the user to operate the handset, and wherein the carrier customer service system is configured to use the diagnostic data to assist the user to operate the handset.

13. The system of claim 10, further comprising an encoder and a decoder configured to promote communication between the carrier customer service system and the handset diagnostic engine, the encoder operable to encode requests for diagnostics data from the carrier customer service system to the diagnostics engine and the decoder operable to decode the diagnostic data received by the carrier customer service system from the handset diagnostic engine.

14. The system of claim 7, further comprising:
a customer service system of the manufacturer of the handset; and
a proxy component configured on the computer of the user to promote communication between the handset and the customer service system of the manufacturer to enable the customer service system of the manufacturer to assist the user to operate the handset.

15. A method for handset diagnostics, comprising:
obtaining, with a diagnostic engine on a handset, diagnostic data for the handset from a customer service system;
selecting an application on the handset to use the diagnostic data to assist a user of the handset to operate the handset;
when said handset is inoperable to communicate via a carrier wireless network, communicating with the handset using a computer of a user of the handset;
selecting an application using the computer to obtain diagnostic data from the handset to enable the handset to communicate via the carrier wireless network;
when the application is unable to enable the handset to communicate via the carrier wireless network, using the computer of the user as a proxy to promote communication between the handset and a customer service system of the carrier wireless network to enable the handset to communicate via the carrier wireless network, the customer service system comprising a tool operable to obtain the diagnostic.

16. The method of claim 15, wherein the application is on the computer.

17. The method of claim 15, wherein the computer of the user of the handset is coupled to communicate with the handset via a communication channel selected from a group consisting of a wired connection, a wireless connection, an infrared connection, and an optical connection.

18. The method of claim 15, wherein the application includes a help portion and a diagnosis portion, wherein the diagnosis portion includes error logs and dropped calls information which are accessible to the user of the handset only by the application and settings data to enable the handset to communicate via the carrier wireless network, and wherein the help portion includes user manual data for the handset.

19. The method of claim 18, wherein the application on the computer accesses a knowledge base for the handset to enable the handset to communicate via the carrier wireless network.

20. The method of claim 15, wherein when the handset is operable to communicate via the carrier wireless network, the method further includes:
the user selecting the application using the computer to assist the user to operate the handset; and
when the user still requires assistance to operate the handset, selecting for the handset to communicate with the customer service system of the carrier wireless network to assist the user to operate the handset.

* * * * *